United States Patent
Austin

(10) Patent No.: US 10,320,528 B2
(45) Date of Patent: Jun. 11, 2019

(54) FAULT TOLERANT COMMUNICATION CHANNEL

(71) Applicant: Silicon Laboratories Inc., Austin, TX (US)

(72) Inventor: James D. Austin, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 205 days.

(21) Appl. No.: 15/493,594

(22) Filed: Apr. 21, 2017

(65) Prior Publication Data

US 2018/0309542 A1    Oct. 25, 2018

(51) Int. Cl.
*G06F 11/00*    (2006.01)
*H04L 1/14*     (2006.01)
*H04L 5/14*     (2006.01)

(52) U.S. Cl.
CPC . *H04L 1/14* (2013.01); *H04L 5/14* (2013.01)

(58) Field of Classification Search
CPC .. G06F 11/008; G06F 11/079; G06F 11/3409; G06F 11/3452; G06F 11/3604; G06F 11/2056; G06F 11/2058; G06F 11/2076
USPC .................................................. 714/6.23, 37
See application file for complete search history.

(56) References Cited

U.S. PATENT DOCUMENTS

| | | | |
|---|---|---|---|
| 2005/0152386 A1* | 7/2005 | Lesartre | H04L 1/0061 370/428 |
| 2012/0304017 A1* | 11/2012 | Martin | G06F 11/1641 714/43 |

OTHER PUBLICATIONS

Motorola, Inc., "SPI Block Guide V03.06," Document No. S12SPIV3/D, Original Release Jan. 21, 2000, Revised Feb. 4, 2003, 38 pages.

* cited by examiner

*Primary Examiner* — Sarai E Butler
(74) *Attorney, Agent, or Firm* — Zagorin Cave LLP

(57) ABSTRACT

A fault tolerant communication protocol transmits information across a communication channel from a transmitting device to a receiving device. The receiving device echoes back a copy of the transmitted information to the transmitting device. The transmitting device sends a first valid signal across the communication channel if the echoed information matches the transmitted information. The receiving device sends a second valid signal across the communication channel responsive to the first valid signal. The transmitting device stops sending of the first valid signal responsive to the second valid signal and the receiving device stops sending the second valid signal responsive to determining the first device has stopped sending the first valid signal. The receiving device can then update its state based on a successful transfer.

20 Claims, 8 Drawing Sheets

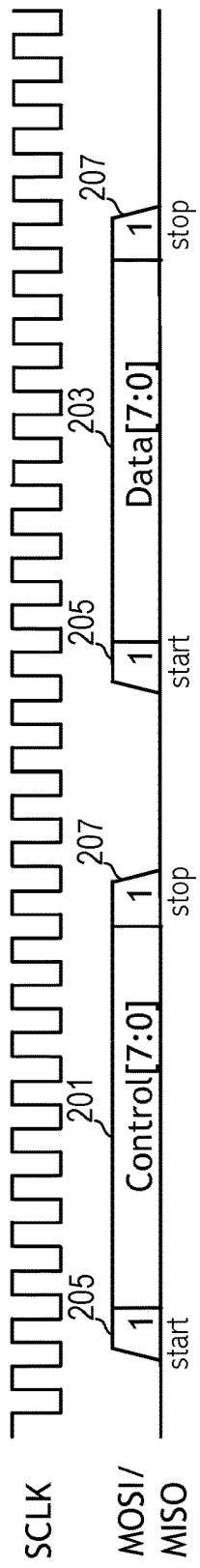

Write Operation

Master State Machine

Slave State Machine

FAULT TOLERANT COMMUNICATION CHANNEL

BACKGROUND

Field of the Invention

This application relates to communication protocols and more particularly to fault tolerant communication protocols.

Description of the Related Art

In order to ensure successful transmission of information, existing error detection and correction techniques append redundant bits to the transmitted data that can be used to detect and correct transmission errors. For example, a simple parity scheme ensures an even (or odd) number of is is transmitted in a byte of data and is effective for detecting single bit errors and certain multi-bit errors. More robust error detection schemes use other techniques such as the cyclic redundancy check (CRC) that appends a CRC block to a data block based on polynomial division to the data block being transmitted. The received data is run through the same polynomial calculation and the transmission is considered successful if the CRC block on the receive side matches the CRC block transmitted. While such schemes are useful in many applications, additional fault tolerant architectures are desirable.

SUMMARY OF EMBODIMENTS OF THE INVENTION

Accordingly, in an embodiment, a method includes transferring first information across a communication channel from a first device to a second device. The second device echoes back a copy of the first information to the first device. The first device compares the copy to the first information to determine if transfer of the first information to the second device was successful. The first device sends a valid signal across the communication channel responsive to a determination the transfer was successful. The second device sends a valid acknowledge signal across the communication channel responsive to the valid signal. The first device stops sending the valid signal responsive to the valid acknowledge signal and the second device stops sending the valid acknowledge signal responsive to determining that the first device has stopped sending the valid signal.

In another embodiment, an apparatus includes a first device, a second device, and a communication channel between the first device and the second device. The communication channel includes a first data path for transmitting information from the first device to the second device, a second data path for transmitting information from the second device to the first device, and a clock signal path for transmitting a clock signal. The first device is configured to transmit information over the first data path to the second device. The second device is configured to echo back the information to the first device over the second data path. The first device is configured to compare the echoed back information to the information and to send a valid signal across the communication channel responsive to a determination of a successful transfer based on the compare. The second device is configured to respond to the valid signal to send a valid acknowledge signal across the communication channel. The first device is configured to stop sending the valid signal responsive to the valid acknowledge signal and the second device is configured to stop sending the valid acknowledge signal responsive to determining that the first device has stopped sending the valid signal.

In another embodiment, an apparatus includes a transmitting device and a receiving device. A first data path couples the transmitting device to the receiving device. A second data path couples the receiving device to the transmitting device, and a clock signal path transmits a clock signal. The receiving device is configured to echo back data received over the first data path to the transmitting device over the second data path while at least a portion of the data is still being received over the first data path. The transmitting device is configured to send a valid signal across the first data path responsive to the echoed back data matching data transmitted by the transmitting device. The receiving device is configured to respond to the valid signal to send a valid acknowledge signal across the second data path to the transmitting device and the transmitting device is configured to stop sending the valid signal responsive to the valid acknowledge signal. The receiving device is configured to stop sending the valid acknowledge signal responsive to determining the transmitting device has stopped sending the valid signal.

BRIEF DESCRIPTION OF THE DRAWINGS

The present invention may be better understood, and its numerous objects, features, and advantages made apparent to those skilled in the art by referencing the accompanying drawings.

FIG. 2 illustrates two types of transactions (read and write) that are available over the communication channel.

FIG. 3 illustrates the control packet.

The use of the same reference symbols in different drawings indicates similar or identical items.

DETAILED DESCRIPTION

Figure 1:
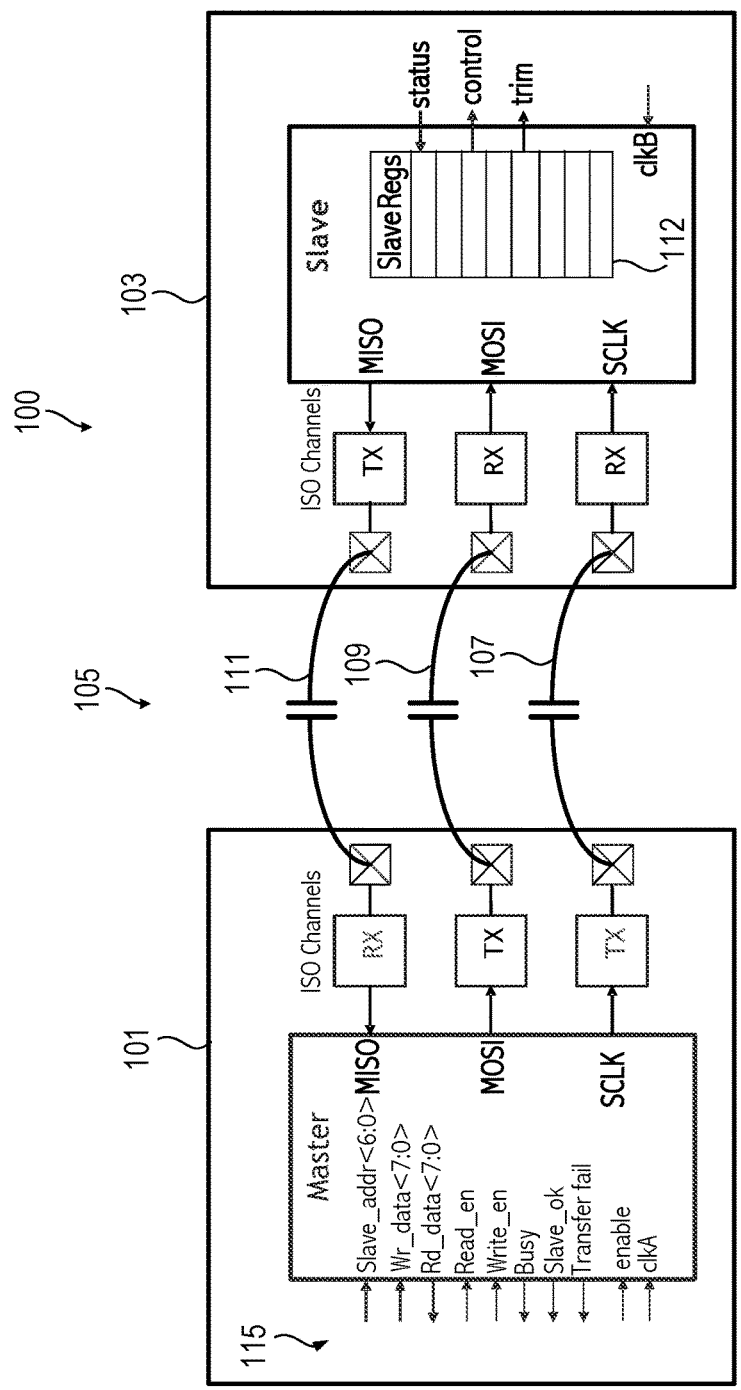
FIG. 1 illustrates a system that includes a fault tolerant communication system to communicate between devices.

Referring to FIG. 1, a system 100 includes a fault tolerant communication system to communicate between device 101 and device 103. In an embodiment, the devices 101 and 103 are part of an isolator and the communication is across a communication channel 105 that spans an isolation barrier. The isolation barrier provides electrical isolation between two voltage domains. Such isolation may be needed because during normal operation a large DC or transient voltage difference exists between the domains. Isolation barriers typically have layers of dielectrics with good breakdown properties. Communication across the isolation barrier may be accomplished, e.g., using optical (opto-isolators), inductive (transformer) solutions, or using capacitive isolation circuitry. In the illustrated embodiment, the device 101 is the Master and the device 103 is the Slave. The illustrated embodiment of the communication channel includes three unidirectional signaling lines. The Master provides SCLK 107 that functions as the interface reference clock. The Master provides the (master out slave in (MOSI)) signal line 109 for the data transmitted from Master to Slave. The Slave provides master in slave out (MISO)) 111 for the data transmitted from the Slave to the Master.

The communication channel provides a robust, fault-tolerant, simple digital communication protocol. As can be seen, the embodiment shown in FIG. 1 requires only 3 signal lines. In addition, the simple digital communication protocol has low design complexity and area requirements. Both Master and Slave recognize transmission errors, and signal the need to initiate a retry, avoiding erroneous state changes. Embodiments of the communication channel use idle state signal transmission to indicate to the other side that it is alive. The Master and Slave verify each transaction by echoing back a copy of the transmitted data to the originator. Correct reception signaled by transmitter to receiver ensures only valid state changes occur. Because the interface includes a clock, no clock recovery is required.

FIG. 2 illustrates two types of transactions that are available over this communication channel: Read transactions and Write transactions. Other embodiments may include additional transactions, such as a reset. Both the read and write transactions are composed temporally of first the Control Packet 201, and second the Data Packet 203. In both cases, the Master initiates all transactions by transmitting the Control Packet over MOSI, followed by: (1) for a Write transaction, the Master transmits the Data Packet over MOSI; (2) for a Read transaction, Slave transmits the Data Packet over MISO. All transactions are bounded on both sides of the actual data component by a Start Bit 205 and a Stop Bit 207. Both Slave and Master use the packet size (here 8 bits although other packet sizes can be used) to know when to expect the Stop Bit following the Start Bit, referenced to a fixed number of SCLK periods.

FIG. 3 illustrates an example of a control packet. One bit (bit 7) of the control packet designates read (R) or write (Wb), where "b" indicates active low and the next 7 bits designate the address for the read or write operation. The read or write data is 8 bits. The start and stop bits are a "1" on the MOSI signal line, which is low when idle. The start and stop bits for transmissions by the Slave on MISO are also "1".

One aspect of the fault tolerance in the protocol is that for each bit of the packet transaction transmitted (either Data Packet or Control Packet), the receiver echoes back a copy of the last bit received to the transmitter in the next SCLK period. For a packet transmitted by the Master over MOSI, the Slave echoes back its interpretation of the packet over MISO, shifted in time by one SCLK period. For a packet transmitted by the Slave over MISO, the Master echoes back its interpretation of the packet over MOSI, shifted in time by one SCLK period.

Figure 4:
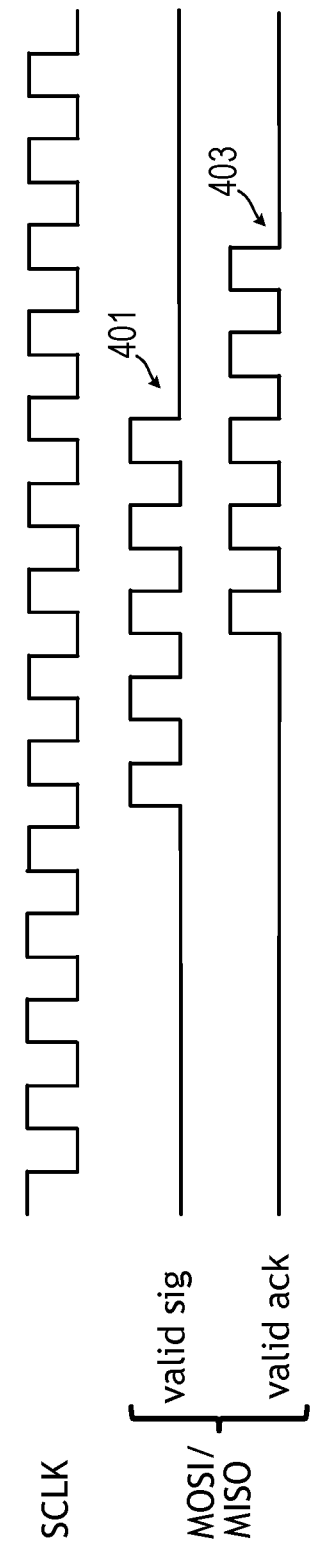
FIG. 4 illustrates the valid signaling protocol used by the transmitter and receiver to communicate whether the transfer was successful.

Referring to FIG. 4, during the transmission of a packet, the transmitter (Master or Slave) monitors the receiver's echo of the packet to ensure its correctness. After the packet has been completely transmitted, a short quiet period is entered on the communication signal lines. If the transmitter determines that the echoed data matches the originally transmitted data, the transmitter signals to the receiver its reception has been verified using special valid signal sequence (valid_sig) 401 over its signaling terminal (MOSI for Master transmitted packets, MISO for Slave transmitted packets). When the receiver detects this valid signal sequence within a fixed time window, the receiver signals back to the transmitter a valid acknowledge (valid ack) signal sequence 403 over its signaling terminal (MISO for Master transmitted packets, MOSI for Slave transmitted packets). The valid ack signal has the same signaling as the valid signal as described below. Next, when the transmitter detects the special valid ack signal sequence 403 from the receiver within a fixed time window, the transmitter discontinues its valid signal sequence 401. Following this, when the receiver detects that the transmitter has discontinued its valid signal sequence 401, the receiver discontinues its valid ack signal sequence 403, and updates the appropriate local state (e.g., an address or data register) as a result of the successful packet transmission. Finally, when the transmitter detects that the receiver has discontinued its valid ack signal sequence, the transmitter concludes that the receiver has correctly updated its state, the current packet transmission is completed, and the next packet transmission may begin.

Note that the valid signal and the valid ack signal sequences are special sequences that differ from a normal data bit signal, since the valid signal and valid ack signals both toggle at the frequency of SCLK, whereas a normal data bit signal changes at most once per SCLK period. Thus, while a receiver samples a data bit signal in either a Data Packet or a Control Packet once per SCLK period, special circuitry allows for the detection of the valid signal and valid ack signal that toggles at the frequency of SCLK.

Figure 5A:
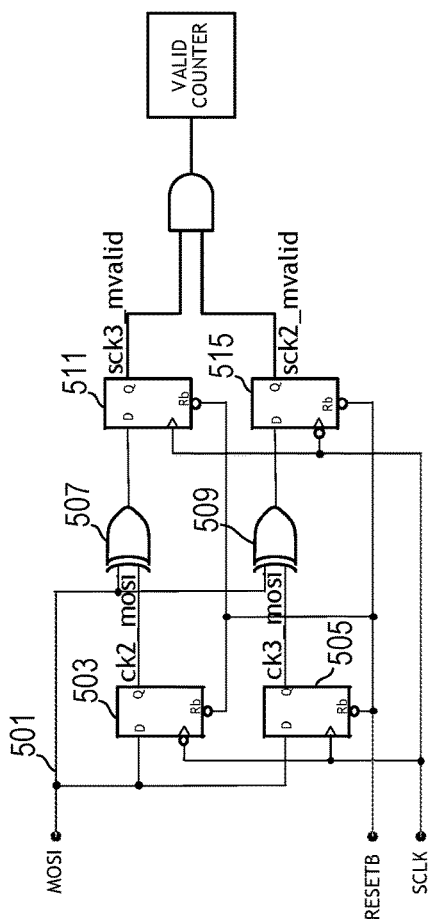
FIG. 5A illustrates an embodiment of detection circuity used to detect the valid and valid ack signals.
Figure 5B:
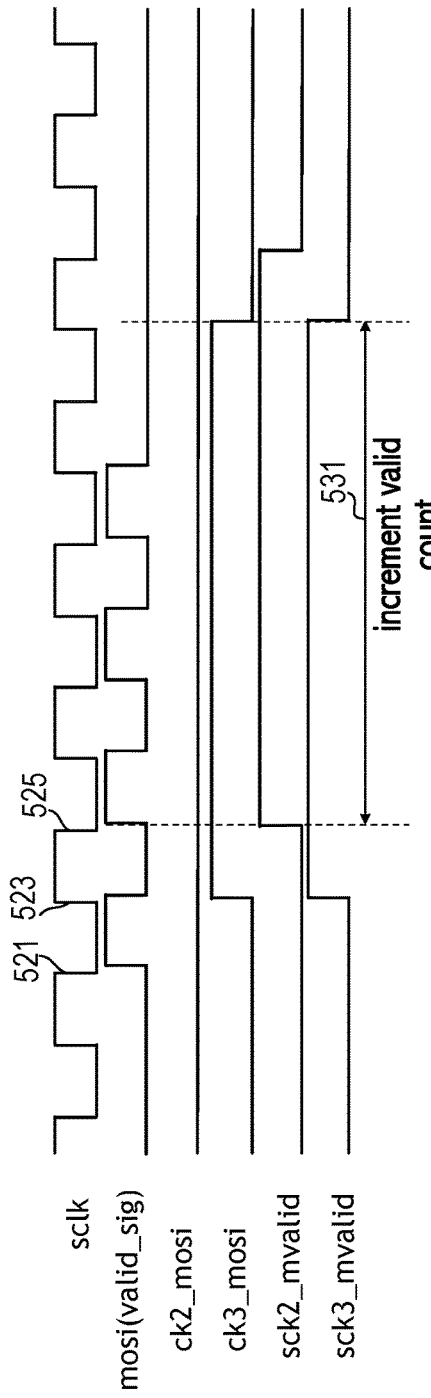
FIG. 5B illustrates a timing diagram associated with the detection circuitry to detect the valid and valid ack signals.

FIG. 5A illustrates an embodiment of a valid signal detection circuit used to detect the valid and valid ack signals. For ease of reference for FIGS. 5A and 5B, the valid and valid ack signals will be referred to generically as valid signals. The same circuitry may be used on both the Slave and Master to detect the valid and valid ack signals. In the illustrated embodiment, the valid signal is transmitted over MOSI but the circuit can be used to detect valid and valid ack signals transmitted over MISO. The MOSI signal 501 is supplied to the input of flip-flops 503 and 505. Flip-flop 503 samples MOSI on the falling edge of the SCLK. Given the sampling time and the valid signal, the output of flip-flop 503 (ck2_mosi) is always low as shown in FIG. 5B. Flip-flop 505 samples MOSI at the rising edge of SCLK. XOR gates 507 and 509 receive the outputs of the flip-flops 503 and 505, respectively, and the MOSI signal line 501. The XOR gates supply flip-flops 511 and 515, which are clocked on the rising edge of SCLK and the falling edge of SCLK, respectively.

FIG. 5B shows a timing diagram associated with the circuit of FIG. 5A. Flip-flop 503 samples the Valid ACK signal at 521, when MOSI is low. Flip-flop 511 samples the output of XOR gate 507 at 523 when MOSI is high. Thus, the output of the XOR gate 507 is high when sampled at 523 and the output of flip-flop 511 sck3_mvalid is high indicating the valid signal line sampled by the rising edge of the clock signal is toggling.

Flip-flop 505 samples the Valid ACK signal on the rising edge of SCLK at 523, when MOSI is high. Flip-flop 515 samples the output of XOR gate 509 at 525 when MOSI is low. Thus, the output of the XOR gate 509 is high when sampled at 525 and the output of flip-flop 515 sck2_mvalid goes high indicating the valid signal line sampled by the falling edge of the clock signal is toggling. When the outputs of both flip-flops 511 and 515 are high, as shown in the region 531 (increment valid count) in FIG. 5B, a count value of the Valid ACK signal is incremented, e.g., on the rising edge of SCLK (or another internal clock). In an embodiment, when the valid count reaches a value of two, the transmitting or receiving device checking the valid signal considers a valid signal to have been received. Once the valid signal is detected the device receiving the valid signal takes action as shown in FIG. 4.

Figure 6:
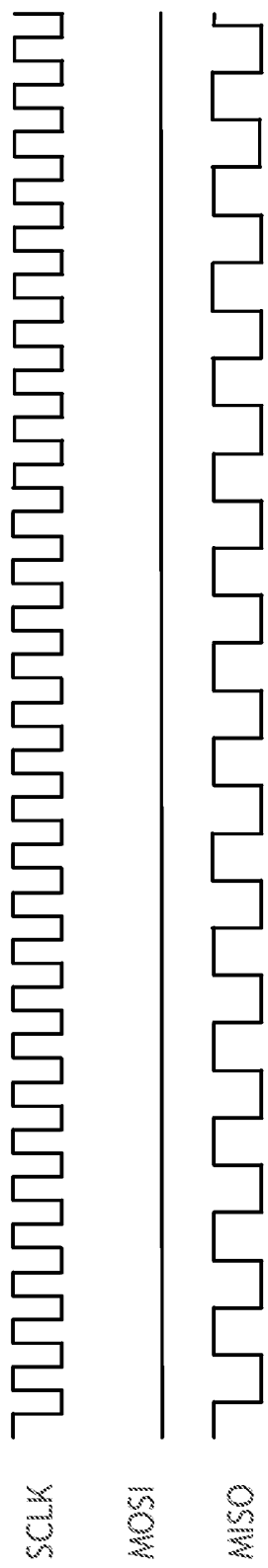
FIG. 6 illustrates a mechanism that can be used to make the Master aware that the Slave is awake and operational and to make the Slave aware that the Master is awake.

Referring to FIG. 6, the protocol provides a mechanism whereby the Master is aware that the Slave is awake and operational and the Slave is aware that the Master is awake. In the normal Idle state (no data being transmitted), SCLK continues to run, indicating to the Slave that the Master is awake and running. The Slave transmits an idle signal having a frequency that is different than SCLK (e.g., SCLK/2 or SCLK/4) back to the Master using the MISO signal line during idle, indicating to the Master that the Slave is awake and ready. The MOSI signal remains low, signaling the Idle condition to the Slave.

Figure 7:
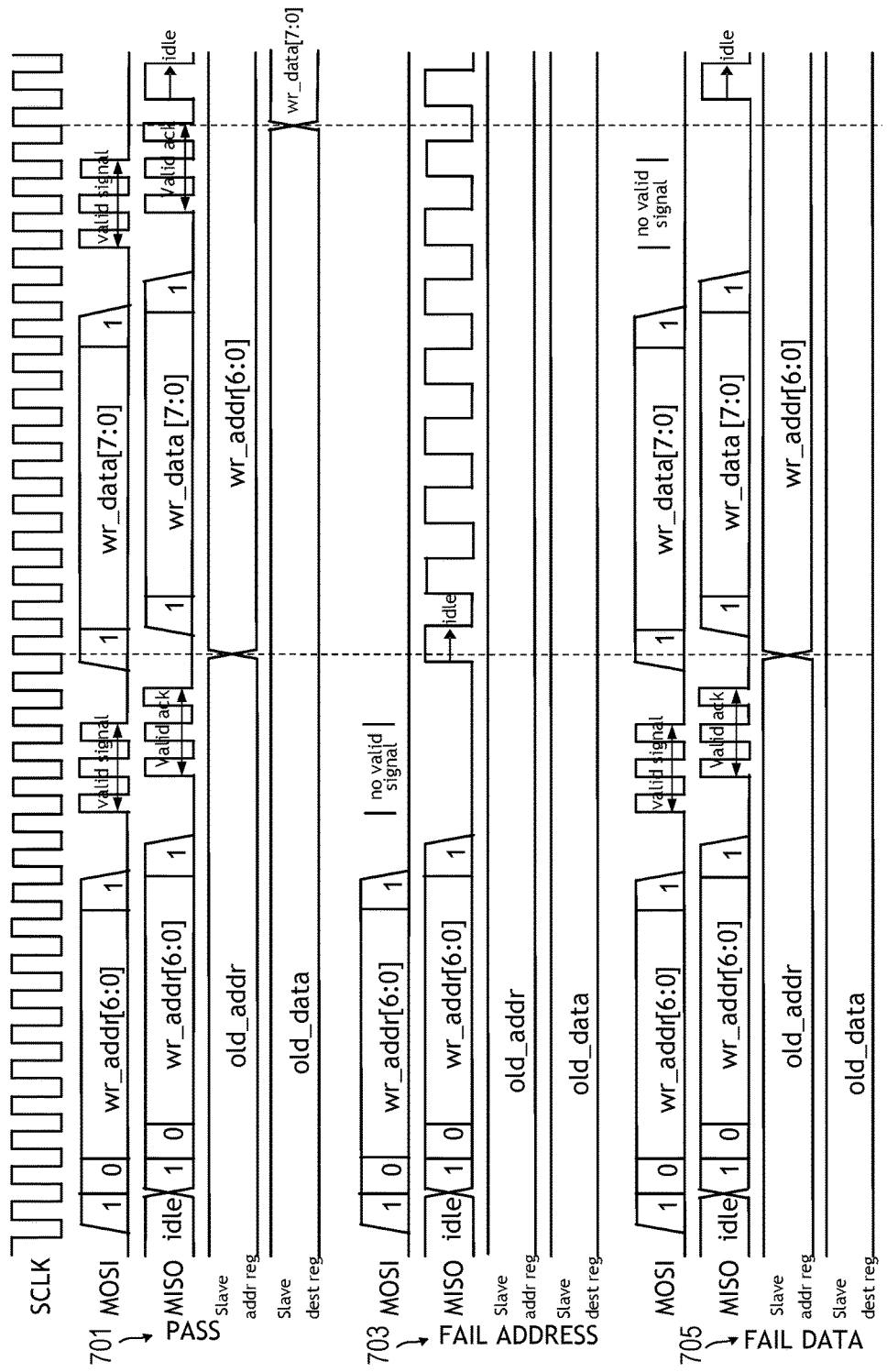
FIG. 7 illustrates various aspects of a write operation.

FIG. 7 illustrates various aspects of a write operation according to an embodiment. FIG. 7 shows a successful write operation 701, an unsuccessful write operation 703 having a failure associated with sending the Control packet, and an unsuccessful write operation 705 with a failure associated with sending the Data packet. The successful write operation starts with a transition on MOSI from 0 to 1 indicating a start bit, followed by one bit ("0") indicating a write operation followed by a 7 bit write address, followed by a stop bit. The Slave detects the start bit and exits the idle state. The Slave echoes back the Control packet including the start bit and the stop bit with a delay of one SCLK. When the Master detects that the echoed data matches the transmitted data the Master sends the valid signal on MOSI. When the Slave detects the valid signal, the slave sends a valid acknowledge (valid ack). When the Master detects the valid ack, the master stops sending the valid signal. When the slave detects the end of the valid signal, the Slave stops transmitting the valid ack signal. The Slave write address register is updated with wr_addr[6:0] after the successful transfer and the valid ack has stopped.

Following the valid ack from the Slave the Master transmits the 8 bit write data packet (wr_data[7:0]) preceded by a start bit and followed by a stop bit. The Slave again echoes back the data packet including the start and stop bits to the Master with a one SCLK period delay. The Master confirms the echoed packet matches the sent packet and the valid signal transmission by the Master and the subsequent valid acknowledgement by the Slave indicates successful transmission of the data packet. MOSI returns to a low value as the idle value and MISO returns to its idle state by transmitting SCLK/2. After the Slave stops transmitting the valid ack signal, the Slave updates the location specified by the write address with wr_data[7:0]. During the transaction, the Slave monitors the MOSI signal from the stop bit through the valid sequence, and the master monitors the MISO signal from the stop bit through the valid sequence. If an unexpected signal value is detected during this time, the corresponding Master or Slave state machine reverts to its idle state.

FIG. 7 also shows an unsuccessful write operation 703 with a failure in the Control packet transmission. The write starts with a transition on MOSI from 0 to 1 indicating a start bit, followed by one bit ("0") indicating a write operation followed by a 7 bit write address, followed by stop bit. The Slave echoes back the Control packet with a delay of one SCLK. However, the Master detects that the echoed data does not match the transmitted data (or another failure occurs) and the Master does not send the valid signal on MOSI. After a predetermined time period, e.g., 5 SCLKs or other appropriate value, without a valid signal on MOSI, the Slave returns MISO to idle. MOSI is also at idle. The Slave does not update its address and data registers because the transfer was not successful.

FIG. 7 also shows an unsuccessful write operation 705 having a failure associated with sending the Data packet. The unsuccessful write operation starts with a transition on MOSI from 0 to 1 indicating a start bit, followed by one bit ("0") indicating a write operation followed by a 7 bit write address, followed by stop bit. The Slave echoes back the Control packet with a delay of one SCLK. In this case, the Master detects that the echoed data matches the transmitted data and the Master sends the valid signal on MOSI. When the Slave detects the valid signal, the slave sends a valid acknowledge (valid ack) signal. When the Master detects the valid ack, the master stops sending the valid signal. When the slave detects the end of the valid signal, the Slave stops transmitting the valid ack signal. The Slave write address register is updated with wr_addr[6:0] after the successful transfer and the valid ack has stopped.

Following the valid ack from the Slave, the Master transmits the 8 bit write data packet preceded by a start bit and followed by a stop bit. The Slave again echoes back the data packet to the Master with a one SCLK period delay. However, the echoed data does not match the transmitted data (or the Master fails to send the acknowledge signal for another reason). Thus, the Master does not send a valid signal. After a predetermined time period, e.g., 5 SCLKs or other appropriate time period without a valid signal on MOSI, the Slave returns the MISO signal line to idle. The MOSI signal line is also at idle. The Slave does not update its write data register because the data portion of the write operation was unsuccessful.

Figure 8:
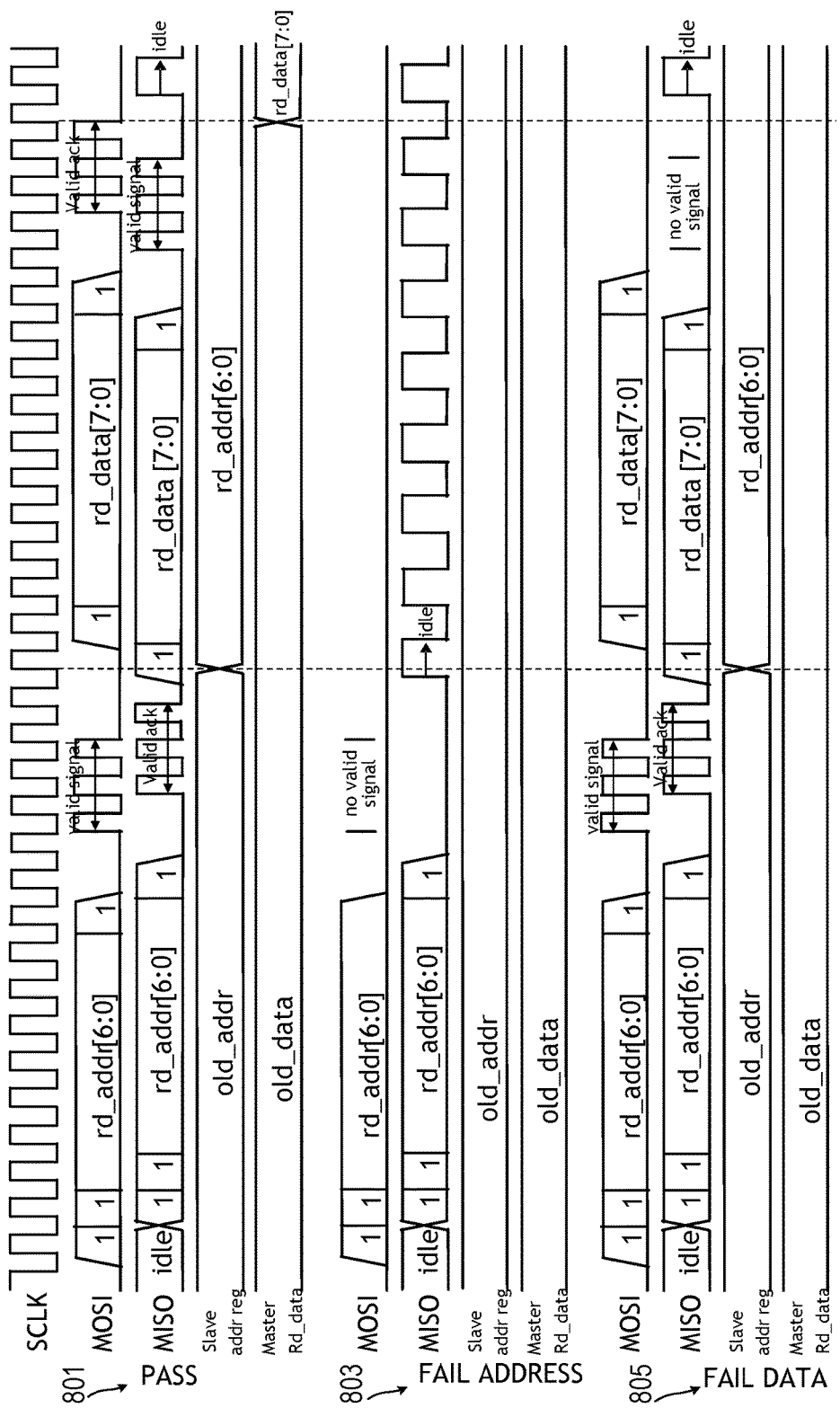
FIG. 8 illustrates various aspects of a read operation.

FIG. 8 illustrates various aspects of a read operation according to an embodiment. FIG. 8 shows a successful read operation 801, an unsuccessful read operation 803 having a failure associated with sending the Control packet, and an unsuccessful read operation 805 having a failure associated with sending a Data packet. The successful read operation starts with a transition on MOSI from 0 to 1 indicating a start bit, followed by a control bit ("1") indicating a read operation followed by a 7 bit read address (rd_addr[6:0]), followed by stop bit. The Slave echoes back the Control packet with a delay of one SCLK. When the Master detects that the echoed packet matches the transmitted packet the Master sends the valid signal on MOSI. When the Slave detects the valid signal, the slave sends a valid acknowledge (valid ack). When the Master detects the valid ack, the master stops sending the valid signal. When the slave detects the end of the valid signal on MOSI, the Slave stops transmitting the valid ack signal. The Slave read address register is updated with rd_addr[6:0] after the successful transfer and the valid ack has stopped.

Following the valid ack from the Master, the Slave transmits the 8 bit read data packet preceded by a start bit and followed by a stop bit. The Master echoes back the data packet to the Slave with a one SCLK period delay. The valid signal transmission by the Slave and the subsequent valid acknowledgement by the Master indicates successful transmission of the read data packet from the Slave to the Master. MOSI returns to a low value as the idle value and MISO returns to its idle state by transmitting SCLK/2. After the Master stops transmitting the valid Ack signal, the Master updates read data register with rd_data[7:0]. During the transaction, the Slave monitors the MOSI signal from the stop bit through the valid sequence, and the master monitors the MISO signal from the stop bit through the valid sequence. If an unexpected signal value is detected during this time, the corresponding Master of Slave state machine reverts to its idle state.

FIG. 8 also shows an unsuccessful read operation 803 with a failure in the Control packet. The read starts with a transition on MOSI from 0 to 1 indicating a start bit, followed by a control bit ("1") indicating a read operation followed by a 7 bit read address, followed by stop bit. The Slave echoes back the Control packet with a delay of one SCLK. However, the Master fails to detect that the echoed Control packet matches the transmitted packet (or another failure occurs) and the Master does not send the valid signal on MOSI unlike the successful operation 701. After a predetermined time period, e.g., 5 SCLKs or other appropriate value without a valid signal on MOSI, the Slave returns MISO to idle. MOSI is also at idle.

FIG. 8 shows an unsuccessful read operation 805 with a failure associated with sending the Read data packet. The unsuccessful read operation starts with a transition on MOSI from 0 to 1 indicating a start bit, followed by a control bit ("1") indicating a read operation followed by a 7 bit read address, followed by stop bit. The Slave echoes back the Control packet with a delay of one SCLK. In this case, the Master detects that the echoed packet matches the transmitted packet and the Master send the valid signal on MOSI. When the Slave detects the valid signal, the slave sends a valid acknowledge (valid ack). When the Master detects the valid ack, the master stops sending the valid signal. When the slave detects the end of the valid signal, the Slave stops transmitting the valid ack signal. The Slave read address register is updated with rd_addr[6:0] after the successful transfer.

Following the valid ack from the Slave, the Slave transmits the 8 bit read data packet preceded by a start bit and followed by a stop bit. The Master echoes back the read data packet to the Slave with a one SCLK period delay. However, the echoed data does not match the transmitted data (or the Slave fails to send the acknowledge signal for another reason). Thus, the Slave does not send a valid signal. After a predetermined time period, e.g., 5 SCLKs or other appropriate time period without a valid signal on MISO, the Master control logic returns to an idle state and MOSI stays at a low logic level. The Slave returns MISO to idle in response to the failed transmission transmitting the SCLK/2 on MISO. The Master does not update its read data register because the data portion of the read operation was unsuccessful.

Figure 9:
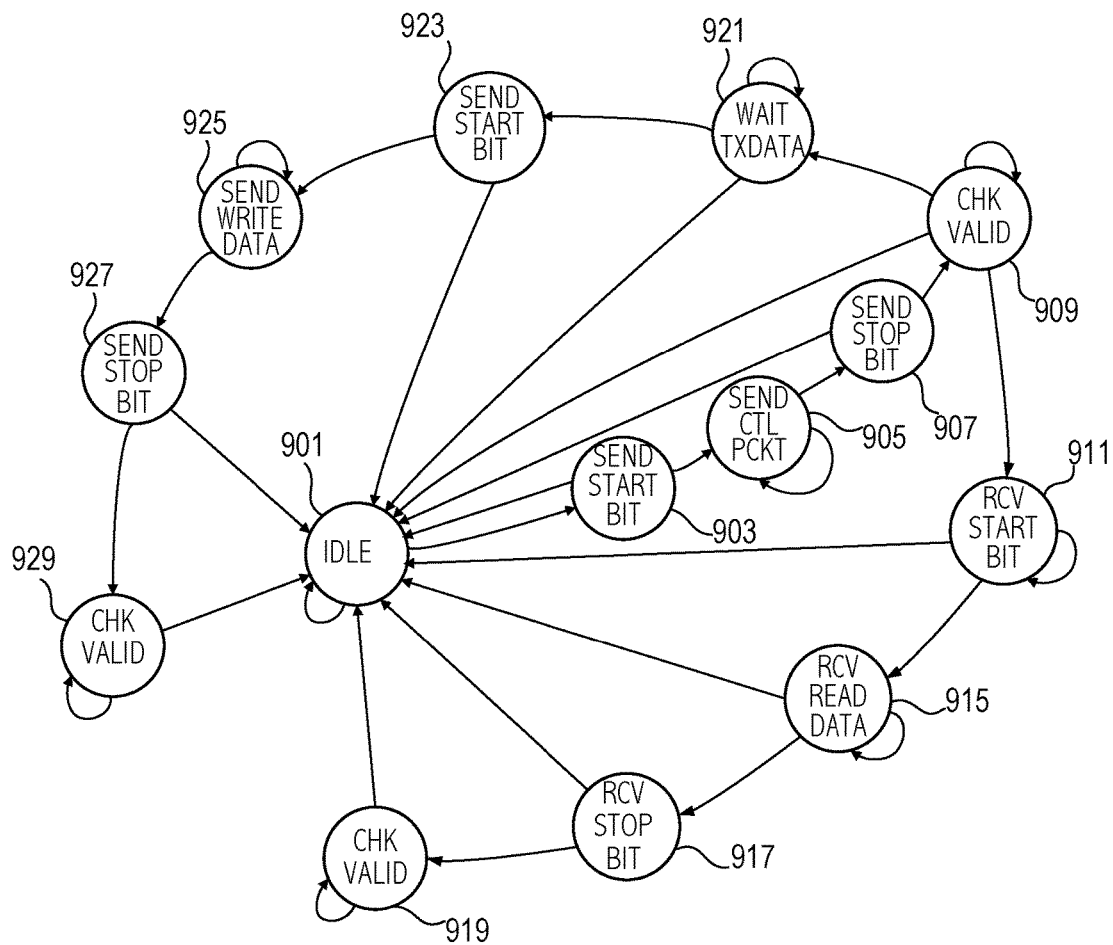
FIG. 9 illustrates an embodiment of a Master state machine.

FIG. 9 illustrates an embodiment of a state machine for controlling the Master. The default state of the Master state machine is the idle state 901. When the Master wants to initiate a transmission, the state machine transitions to state 903 and the Master sends a start bit on MOSI. The Master state machine then transitions to state 905 to transmit the Control packet and remains in that state until the 8 bits of the Control packet have been sent. Following transmission of the control packet, the state machine transitions to state 907 to transmit a stop bit and then to the check valid state 909. In state 909, the Master determines if the transmission was successful. During the states 905, 907, and 909, the Slave echoes back the received bits. In 909, the Master determines if the echoed Control packet matches the Control packet the Master thought was sent. If so, in 909 the Master transmits the valid signal and waits for the slave to send the valid acknowledge signal in accordance with the valid signaling protocol described above.

If the Control packet was for a read operation, the Master transitions to state 911 and awaits a start bit from the Slave. On receipt of the start bit in 911, the Master state machine transitions to state 915 to receive the 8 bit read data packet. After 8 periods of SCLK, the Master expects the stop bit in 917. If the stop bit was received in 917, the Master transitions to a valid sequence. Starting with receipt of the start bit, the Master echoes back received data. In the check valid state 919, the Master state machine determines if the transfer was successful. In state 919, the Master waits for a predetermined period for the Slave to send the valid signal. In response to the valid signal from the Slave, the Master transmits a valid ack signal and stops sending the valid ack signal when the Master detects the Slave has stopped sending the valid signal. The Master then updates its read data register since the transmission was successful and returns to the idle state 901.

If the Control packet was for a write operation, the Master transitions from state 909 to state 921 and waits to transmit data. After a predetermined delay, the Master transitions to state 923 and sends the start bit. After sending the start bit the Master transitions to state 925 to send the 8 bit write data packet. After 8 periods of SCLK, the Master transitions to state 927 to send the stop bit. After sending the stop bit, the Master transitions to the check valid sequence 929. The Master has been receiving the echoed back write data packet with a one cycle delay. In the check valid state 929, the Master state machine determines if the echoed Control packet matches the Control packet the Master thought was sent. If so, in 929 the Master transmits the valid signal and waits for the slave to send the valid acknowledge signal and then stops transmission of the valid signal as described above. When the Slave stops sending the valid ack signal the Master assumes the appropriate registers in the Slave have been updated and the Master state machine returns to the idle state 901.

Note that if the Master state machine detects any unexpected value during any of the states (except states 905 and 925), the Master state machine returns to the idle state 901. For example, the echoed data may not match the transmitted data in one of the chk valid states. A timeout condition may occur waiting for a valid signal or valid ack from the Slave in one of the chk valid states or the Master may not receive a start bit in 911 or a stop bit in 917.

Figure 10:
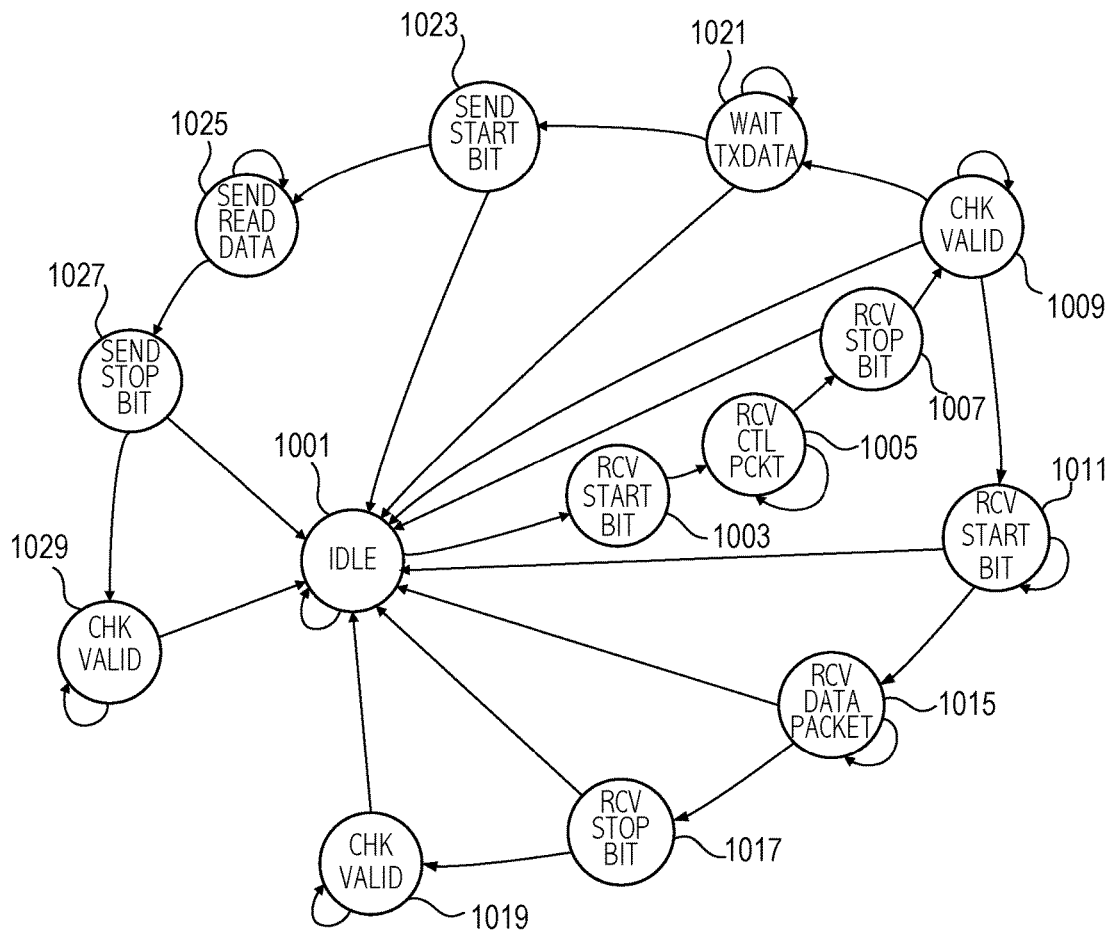
FIG. 10 illustrates an embodiment of a Slave state machine

FIG. 10 illustrates an exemplary state machine for controlling the Slave. The default state of the Slave state machine is the idle state 1001. When the Slave detects a start bit, the Slave state machine transitions to state 1003. The Slave state machine then transitions to state 1005 to receive the Control packet. After 8 bits of the Control packet, the Slave state machine transitions to 1007 awaiting the stop bit. During states 1005 and 1007, the Slave echoes back the Control packet including the start bit and the stop bit with a one SCLK period delay. In 1009 the Slave checks to see if the transfer was valid using the valid signaling protocol described herein. The Slave waits to receive the valid signal from the Master, sends the valid ack signal in response to receiving valid signal from the Master, and stops sending the valid ack signal in response to detecting the Master has stopped sending the valid signal. The Slave updates the address register (read or write) upon successful completion of the valid signaling in 1009.

If the Control packet indicated a write command, the state machine transitions to 1011 to await receipt of the start bit from the Master. On receipt of the start bit in 1011, the Slave state machine transitions to state 1015 to receive the 8 bit write data packet. After 8 periods of SCLK, the Slave expects the stop bit in 1017. If the stop bit is received in 1017, the Slave transitions to check validity of the transfer in 1019. Starting with receipt of the start bit, the Slaves echoes back received data. In the check valid state 1019, the Slave state machine waits for a predetermined period for the Master to send the valid signal. In response to the valid signal from the Master, the Slave transmits a valid ack signal and stops sending the valid ack signal when the Slave detects the Master has stopped sending the valid signal. The Slave then updates its write data register since the transmission was successful and returns to the idle state 1001.

If the Control packet is for a read operation, the Slave transitions to state 1021 and waits for a predetermined time period, e.g., several SCLK cycles, to transmit the requested read data to the Master. After the predetermined delay, the Slave transitions to state 1023 and sends the start bit. After sending the start bit, the Slave transitions to state 1025 to send the 8 bit read data packet. After 8 periods of SCLK, the Slave transitions to 1027 to send the stop bit. After sending the stop bit, the Slave transitions to the check valid sequence 1029. The Master has been echoing back the read data packet with a one cycle delay. In the check valid state 1029, the Slave determines if the echoed read data packet matches the read data packet the Slave thought was sent. If so, in 1029 the Slave transmits the valid signal and waits for the Master to send the valid acknowledge signal and then stops transmission of the valid signal as described above. When the Master stops sending the valid ack signal the Slave assumes the appropriate registers in the Master have been updated and the Slave state machine returns to the idle state 1001.

Note that if the Slave state machine detects any unexpected value during any of the states (except states 1005 and 1025), the Slave state machine returns to the idle state 1001. For example, the echoed data may not match the transmitted data in chk valid state 1029. A timeout condition may occur waiting for a valid ack from the Master in one of the chk valid states 1009 or 1019. The Slave may not receive a start bit in 1011 or a stop bit in 1007 or 1017.

The control state machines in both the Master and Slave systems may be implemented as digital logic on the respective Master and Slave integrated circuits in accordance with standard digital logic design techniques. The Master and Slave state machines may also be implemented as a programmed processor such as a microcontroller. A control program running on the microcontroller implements the state machines describing operation of the Master and Slave state machines. The control state machines included in both the Master and Slave systems provide a mechanism to recover from faulty packet transmissions by returning to idle if unexpected conditions occur. Further, the state machines include time to allow for recovery from stuck conditions on MISO, MOSI, or internally. When a sequencing error has occurred as a result of an error in the packet or other condition, the Master simply enters the Idle state, and monitors the MISO pin until the Slave enters the Idle state. In the worst case where this condition is ineffective, the Master may reset the Slave by stopping the SCLK signal for a predetermined period of time to signal a reset.

In some embodiments, Slave does not update its registers for write operations until two successful write operations have been completed to the same address with the same data. Thus, the Slave may include logic in state 1019 to check to see if this is the second write operation to the same address with the same data and only update the register specified by the write address after this additional check. In some embodiments, the Master does not consider a read operation successful until two successful read operations have taken place from the same address with the same data. In other embodiments, only the read or only the write, or neither operation requires two successful writes or reads. The double write mechanism may be useful when writing critical configuration registers in the Slave device. Referring to FIG. 1, the slave registers 112 provide configuration (trim) data, e.g., to set voltages or currents on the Slave side of the communication interface or to provide control information to control operational aspects of the Slave side. In addition, the slave registers 112 include status information that may be read by the Master.

Referring to FIG. 1, various aspects of the fault tolerant communication channel may be communicated to the Master through interface 115. Thus, in an embodiment, the slave address, write and read data, and status of the communication channel (busy, slave_ok, transfer fail) is supplied to or from the Master from or to an on-chip or off-chip controller. In addition, a read enable signal and a write enable signal cause commands to start once the Slave address and write data (if needed) have been supplied to the Master. Thus, for example, the master state machine leaves the idle state 901 in response to a read or write enable signal received by the Master. In addition, in the illustrated embodiment, a separate enable signal is supplied, e.g., on power on reset or at other times, to allow the communication channel to operate.

Thus, various aspects have been described relating to a fault tolerant communication system. While the communication system has been described for use in an isolation system in FIG. 1, the fault tolerant communication system described herein can be used in other environments as well. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method comprising:
    transferring first information across a communication channel from a first device to a second device;
    the second device echoing back a copy of the first information to the first device;
    the first device comparing the copy to the first information to determine if transfer of the first information to the second device was successful;
    the first device sending a valid signal across the communication channel responsive to a determination the transfer was successful;
    the second device sending a valid acknowledge signal across the communication channel responsive to the valid signal;
    the first device stopping sending the valid signal responsive to the valid acknowledge signal; and
    the second device stopping sending the valid acknowledge signal responsive to determining the first device has stopped sending the valid signal.

2. The method as recited in claim 1, further comprising:
    sending the first information and the valid signal over a first serial data path;
    sending the copy of the first information and the valid acknowledge signal over a second serial data path; and
    sending a clock signal sent from one of the first and second devices to the other of the first and second devices.

3. The method as recited in claim 2, further comprising:
    sending the first information with one data bit being sent per clock period of the clock signal; and wherein the valid signal has at least two logic levels being sent per clock period of the clock signal.

4. The method as recited in claim 1, further comprising:
wherein the first information is part of a write transaction to the second device and a destination address is updated only after the second device determining the first device has stopped sending the valid signal.

5. The method as recited in claim 2, further comprising:
wherein the first device is a master device and the second device is a slave device and the slave device transmits an idle signal to the master device to indicate the slave device is alive during an idle state, the idle signal being a different frequency from the clock signal.

6. The method as recited in 5, further comprising:
the master device continuously sending a clock signal to the slave device to indicate that the master device is alive during idle on the communication channel.

7. The method as recited in claim 1 further comprising;
performing a first and a second write operation; and
verifying an address and data are identical for the first and second write operations before updating a location specified by the address.

8. The method as recited in claim 1 further comprising;
the communication channel is full duplex and the first information is echoed back to the first device with a delay of one clock cycle.

9. The method as recited in claim 2 further comprising;
sampling for the valid signal more often in a time period of the clock signal than sampling for data in the first information.

10. An apparatus comprising:
a first device;
a second device;
a communication channel between the first device and the second device, the communication channel including a first data path for transmitting from the first device to the second device, a second data path for transmitting from the second device to the first device, and a clock signal path for transmitting a clock signal;
wherein the first device is configured to transmit information over the first data path to the second device;
wherein the second device is configured to echo back the information to the first device over the second data path;
wherein the first device is configured to compare the echoed back information to the information and to send a valid signal across the communication channel responsive to a determination of a successful transfer based on the compare;
wherein the second device is configured to respond to the valid signal to send a valid acknowledge signal across the communication channel;
wherein the first device is configured to stop sending the valid signal responsive to the valid acknowledge signal; and
wherein the second device is configured to stop sending the valid acknowledge signal responsive to determining the first device has stopped sending the valid signal.

11. The apparatus as recited in claim 10, further comprising:
wherein the information is transmitted from the first device with one data bit being sent per clock period of the clock signal; and
wherein the valid signal has two logic levels being sent per clock period of the clock signal.

12. The apparatus as recited in claim 10 wherein the information is part of a write transaction to the second device and a destination address is updated after the second device determining the first device has stopped sending the valid signal.

13. The apparatus as recited in claim 10 wherein the first device is a master device and the second device is a slave device and the slave device transmits an idle signal to the master device to indicate the slave device is alive during an idle state and the idle signal is a periodic waveform having an idle signal frequency that is different from a frequency of the clock signal.

14. The apparatus as recited in claim 13, wherein the master device sends the clock signal to the slave device to indicate that the master device is alive during idle periods on the communication channel.

15. The apparatus as recited in claim 10 wherein the first device is a slave device and the second device is a master device and the information is read data responsive to a read command sent from the master device to the slave device.

16. The apparatus as recited in claim 10 wherein the information is a read command, a write command, or write data.

17. The apparatus as recited in claim 10 wherein the communication channel is full duplex and the information is echoed back to the first device with a delay of one period of the clock signal.

18. The apparatus as recited in claim 10 wherein the first device further comprises:
a valid detect circuit to detect the valid signal on the second data path, wherein the valid detect circuit detects the valid signal changing state more often than data changes state on the second data path.

19. An apparatus comprising:
a transmitting device;
a receiving device;
a first data path couples the transmitting device to the receiving device, a second data path couples the receiving device to the transmitting device, and a clock signal path for transmitting a clock signal;
wherein the receiving device is configured to echo back data received over the first data path to the transmitting device over the second data path while at least a portion of the data is still being received over the first data path;
wherein the transmitting device is configured to send a valid signal across the first data path responsive to the echoed back data matching data transmitted by the transmitting device;
wherein the receiving device is configured to respond to the valid signal to send a valid acknowledge signal across the second data path;
wherein the transmitting device is configured to stop sending the valid signal responsive to the valid acknowledge signal; and
wherein the receiving device is configured to stop sending the valid acknowledge signal responsive to determining the transmitting device has stopped sending the valid signal.

20. The apparatus as recited in claim 19 wherein the receiving device is configured to send as an idle signal a periodic signal over the second data path having a frequency that is different than a frequency of the clock signal and the transmitting device is configured to maintain the first data path at a low level to indicate an idle condition to the receiving device.

* * * * *